US010027922B2

(12) United States Patent
Matsuda et al.

(10) Patent No.: US 10,027,922 B2
(45) Date of Patent: Jul. 17, 2018

(54) IMAGING APPARATUS FOR DISPLAYING A SPECIFIC SCENE WHILE CONTINUOUSLY PHOTOGRAPHING, IMAGE PLAYBACK METHOD, AND NON-TRANSITORY COMPUTER-READABLE STORAGE MEDIUM

(71) Applicant: CASIO COMPUTER CO., LTD., Shibuya-ku, Tokyo (JP)

(72) Inventors: Hideaki Matsuda, Tokyo (JP); Jun Muraki, Hamura (JP); Kanako Nakano, Kunitachi (JP); Shohei Sakamoto, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 220 days.

(21) Appl. No.: 15/064,470

(22) Filed: Mar. 8, 2016

(65) Prior Publication Data

US 2016/0277703 A1  Sep. 22, 2016

(30) Foreign Application Priority Data

Mar. 19, 2015  (JP) ................................ 2015-056642

(51) Int. Cl.
*H04N 5/77* (2006.01)
*H04N 5/783* (2006.01)
(Continued)

(52) U.S. Cl.
CPC ............... *H04N 5/772* (2013.01); *G06F 3/03* (2013.01); *H04N 5/232* (2013.01); *H04N 5/783* (2013.01)

(58) Field of Classification Search
CPC ........ H04N 5/783; H04N 5/772; H04N 5/232; G06F 3/03
See application file for complete search history.

(56) References Cited

U.S. PATENT DOCUMENTS

| 7,359,619 B1* | 4/2008 | O'Connor | G11B 27/034 |
| | | | 386/245 |
| 2013/0336590 A1* | 12/2013 | Sentinelli | H04N 5/772 |
| | | | 382/218 |

FOREIGN PATENT DOCUMENTS

| JP | 05015628 A | 1/1993 |
| JP | 09115243 A | 5/1997 |
| (Continued) |

OTHER PUBLICATIONS

Japanese Office Action (and English translation thereof) dated Jun. 15, 2017, issued in counterpart Japanese Application No. 2015-056642.

*Primary Examiner* — Huy T Nguyen
(74) *Attorney, Agent, or Firm* — Holtz, Holtz & Volek PC

(57) ABSTRACT

A control section of an imaging apparatus sets a specific scene in advance, sequentially stores images continuously captured by an imaging section in a storage section, specifies images corresponding to the set specific scene from among the plurality of images stored in the storage section when a predetermined motion of the user is detected during the storing operation, and displays the specified images corresponding to the specific scene on a display section while continuing the storing operation. The control section controls when to start playback of an image of a segment corresponding to the specific scene based on whether or not the image of the segment corresponding to the specific scene is completely stored before a timing of detection of the predetermined motion of the user during the storing operation.

22 Claims, 10 Drawing Sheets

(51) Int. Cl.
*G06F 3/03* (2006.01)
*H04N 5/232* (2006.01)

(56) References Cited

FOREIGN PATENT DOCUMENTS

| | | | |
|---|---|---|---|
| JP | 09190325 A | | 7/1997 |
| JP | 2000023065 A | | 1/2000 |
| JP | 2005005867 A | * | 1/2005 |
| JP | 2007036846 A | | 2/2007 |
| JP | 2010187379 A | | 8/2010 |
| WO | 2008126336 A1 | | 10/2008 |

* cited by examiner

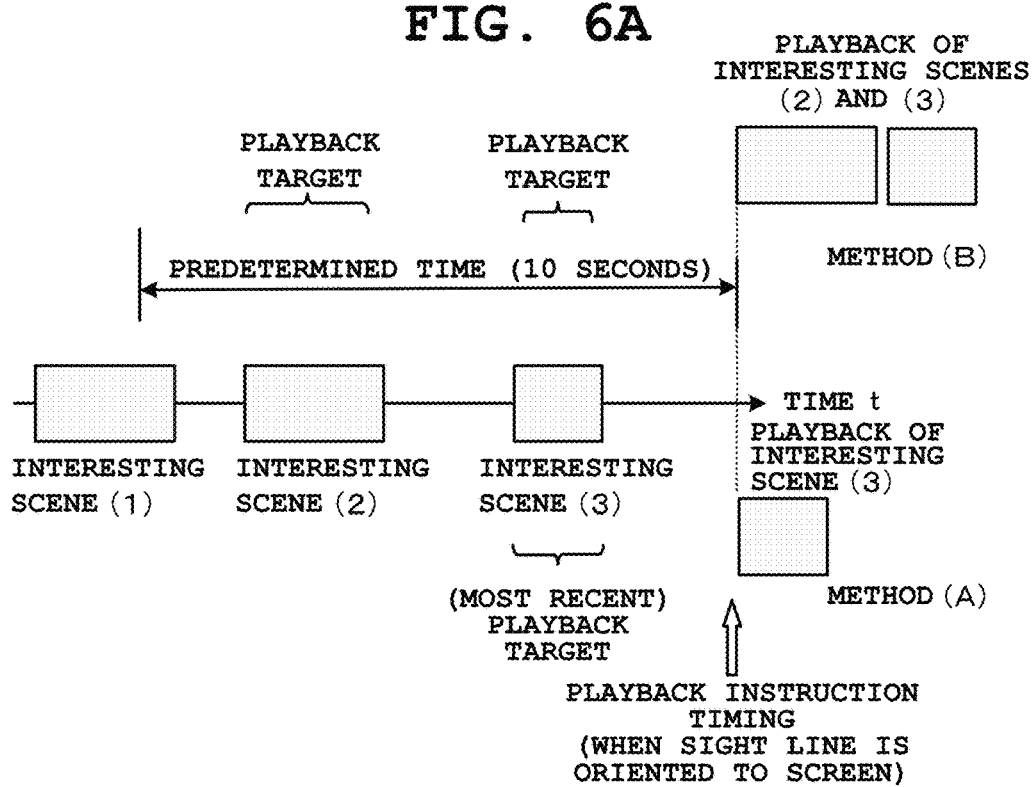
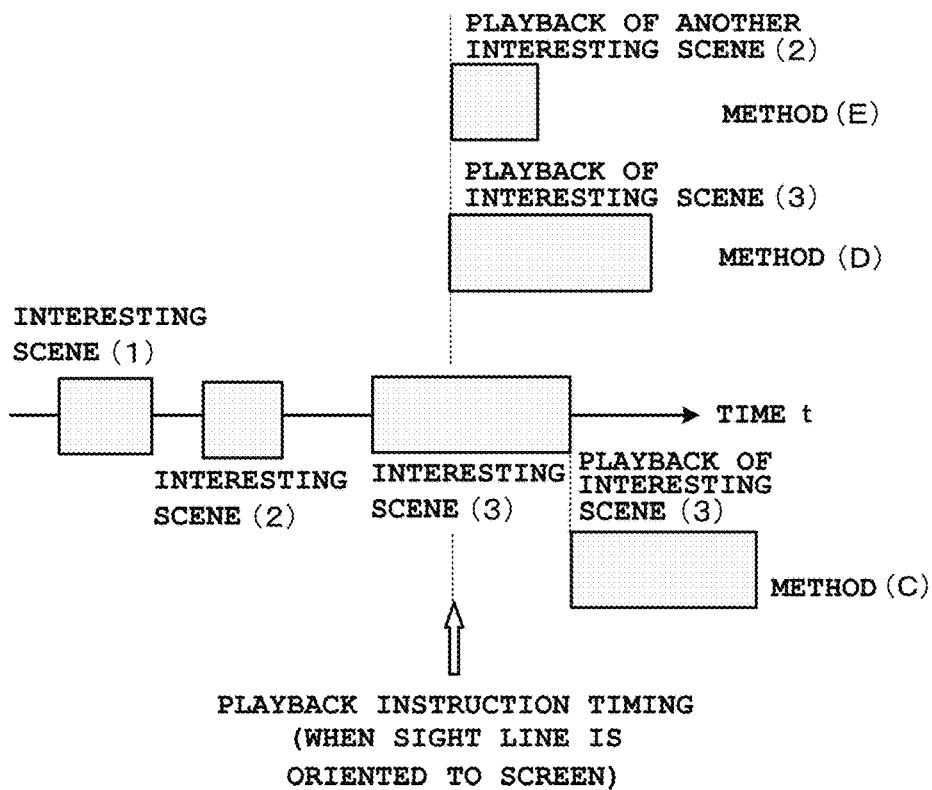

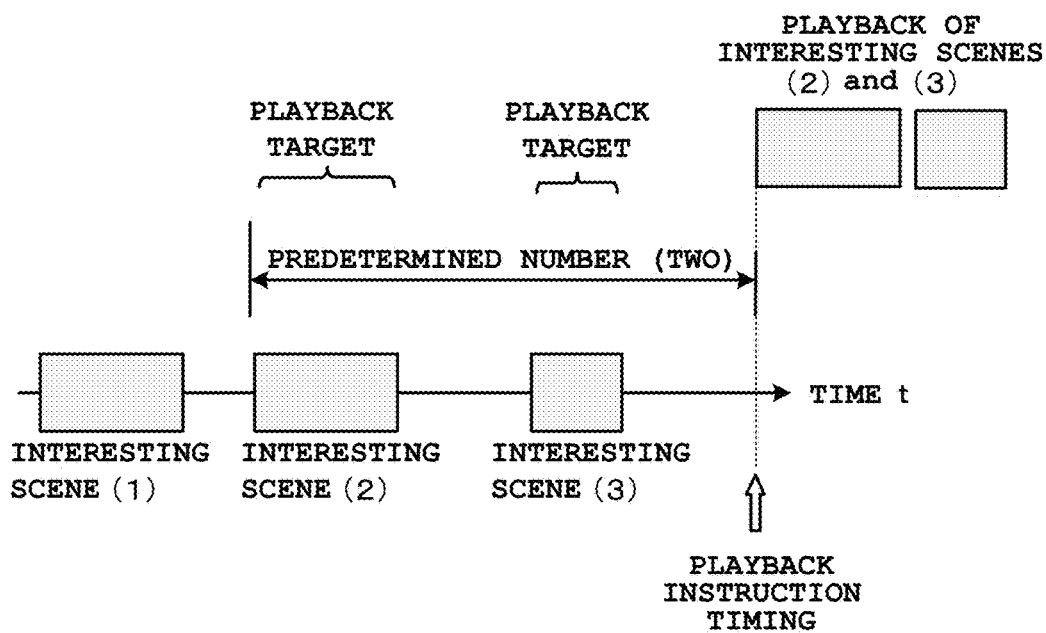
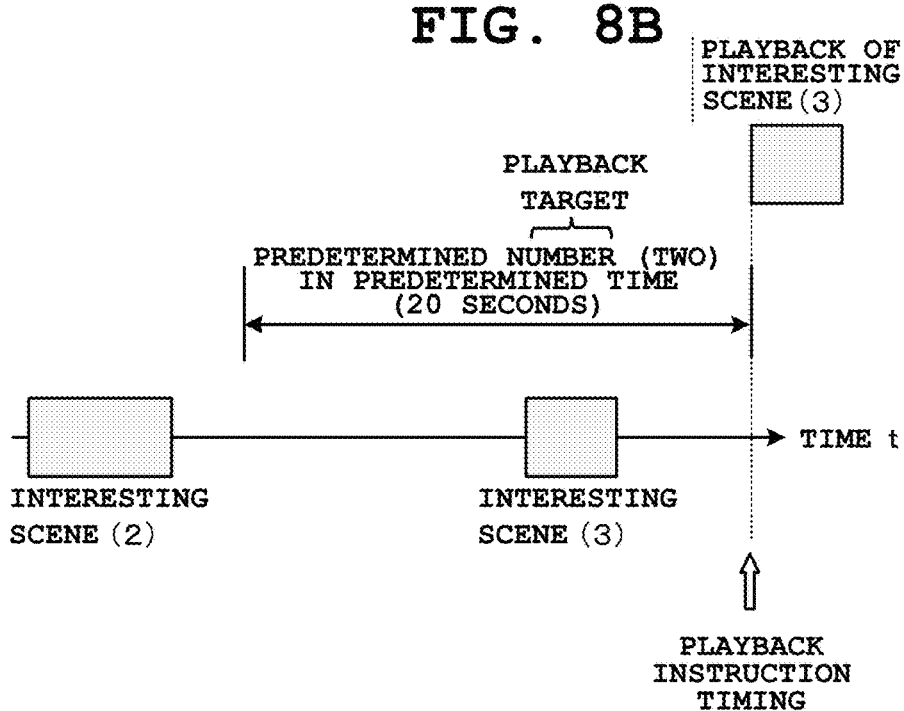

RS PLAYBACK SPEED CHANGE TABLE

| SIGHT LINE ANGLE RANGE | GAZE TIME | PLAYBACK SPEED |
|---|---|---|
| $0 \leq \theta < \theta 1$ | $0 \leq T < T1$ | V1 |
| $\theta 1 \leq \theta < \theta 2$ | $T1 \leq T < T2$ | V2 |
| $\theta 2 \leq \theta \leq \theta 3$ | $T2 \leq T$ | V3 |

V1 > V2 > V3

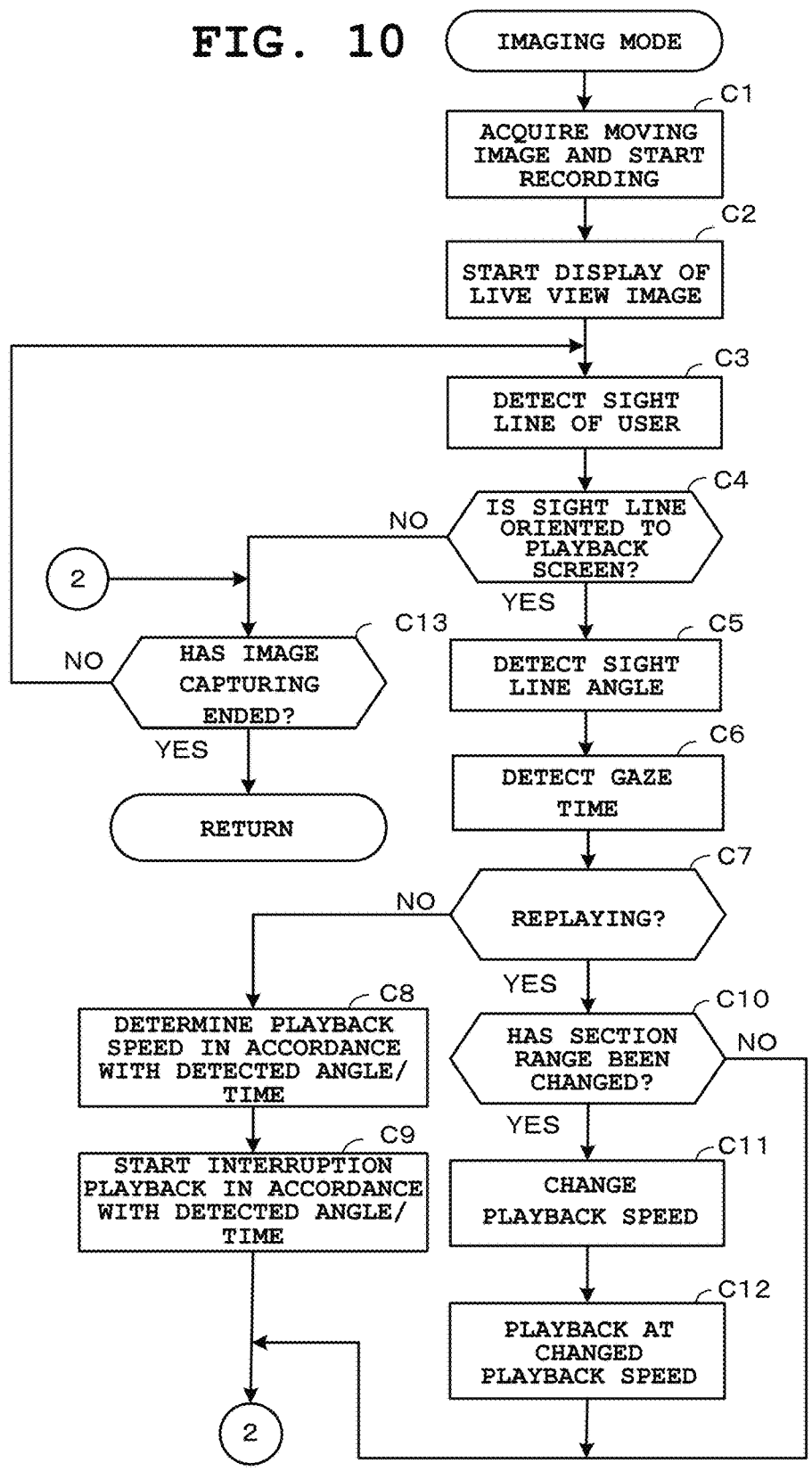

IMAGING APPARATUS FOR DISPLAYING A SPECIFIC SCENE WHILE CONTINUOUSLY PHOTOGRAPHING, IMAGE PLAYBACK METHOD, AND NON-TRANSITORY COMPUTER-READABLE STORAGE MEDIUM

CROSS-REFERENCE TO RELATED APPLICATION

This application is based upon and claims the benefit of priority from the prior Japanese Patent Application No. 2015-056642, filed Mar. 19, 2015, the entire contents of which are incorporated herein by reference.

BACKGROUND OF THE INVENTION

1. Field of the Invention

The present invention relates to an imaging apparatus for controlling display of images continuously captured by an imaging means, and a corresponding image playback method and non-transitory computer-readable storage medium.

2. Description of the Related Art

In general, if timing at which a desired scene appears is unknown when a moving image is captured by an imaging apparatus such as a digital still camera or video camera, first, the user performs an operation of giving an instruction to start moving image recording before the desired scene appears, whereby a recording operation is started. Then, after passing the desired scene, the user performs an operation of giving an instruction to stop the moving image recording operation. Accordingly, in the playback of the recorded moving image, the user has to view not only the desired scene but also images previous and subsequent thereto.

In relation to this problem, a conventional technology is known in which, after a desired scene is specified in advance by a user operation, moving image recording is automatically started at timing at which the specific scene is detected, and then automatically stopped at the end timing of the detection of the specific scene. In association with this. Japanese Patent Application Laid-Open (Kokai) Publication No. 05-15628 discloses a technology in which, when a specific scene (timing when a golf club passes a lowermost point) is detected during image capturing at a high frame rate, recorded images including images captured before and after the detection timing of the specific scene are replayed at a slow speed.

SUMMARY OF THE INVENTION

In accordance with one aspect of the present invention, there is provided an imaging apparatus comprising: an imaging section which includes an image sensor; a display section which includes a display; a storage section which includes a memory; and a control section which includes a processor, wherein the control section performs control of (i) setting a specific scene in advance, (ii) sequentially storing images continuously captured by the imaging section in the storage section as a storing operation, (iii) specifying images corresponding to the specific scene from among a plurality of images stored in the storage section when a predetermined motion of a user is detected during the storing operation, and (iv) displaying the specified images corresponding to the specific scene on the display section while continuing the storing operation, wherein the control section, when there is an image of a segment corresponding to the specific scene completely stored before a timing of detection of the predetermined motion of the user during the storing operation, starts playback of the image of the segment, and wherein the control section, when there is no image of a segment corresponding to the specific scene completely stored before the timing of the detection of the predetermined motion of the user during the storing operation, waits for completion of storage of an image of a segment corresponding to the specific scene which is being stored, and then starts playback of the image of the segment.

In accordance with another aspect of the present invention, there is provided an image playback method for an imaging apparatus, comprising: setting a specific scene in advance; sequentially storing continuously captured images as a storing operation; specifying images corresponding to the specific scene from among a plurality of stored images when a predetermined motion of a user is detected during the storing operation; displaying the specified images corresponding to the specific scene while continuing the storing operation; when there is an image of a segment corresponding to the specific scene completely stored before a timing of detection of the predetermined motion of the user during the storing operation, starting playback of the image of the segment; and when there is no image of a segment corresponding to the specific scene completely stored before the timing of the detection of the predetermined motion of the user during the storing operation, waiting for completion of storage of an image of a segment corresponding to the specific scene which is being stored, and then starting playback of the image of the segment.

In accordance with another aspect of the present invention, there is provided a non-transitory computer-readable storage medium having a program stored thereon that is executable by a computer in an imaging apparatus to perform functions comprising: setting a specific scene in advance; sequentially storing continuously captured images as a storing operation; specifying images corresponding to the specific scene from among a plurality of stored images when a predetermined motion of a user is detected during the storing operation; displaying the specified images corresponding to the specific scene while continuing the storing operation; when there is an image of a segment corresponding to the specific scene completely stored before a timing of detection of the predetermined motion of the user during the storing operation, starting playback of the image of the segment; and when there is no image of a segment corresponding to the specific scene completely stored before the timing of the detection of the predetermined motion of the user during the storing operation, waiting for completion of storage of an image of a segment corresponding to the specific scene which is being stored, and then starting playback of the image of the segment.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6A is a diagram for describing various methods for specifying and replaying playback target images, in which playback instruction timing has been detected after photographing and recording of an interesting scene;

FIG. 6B is a diagram for describing various methods for specifying and replaying playback target images, in which playback instruction timing has been detected during photographing and recording of an interesting scene;

FIG. 8A and FIG. 8B are diagrams for describing a modification example of the first embodiment;

FIG. 10 is a flowchart outlining an operation of an imaging apparatus (operation of a characteristic portion of the second embodiment) that is started when a current mode is switched to an imaging mode in the second embodiment.

DETAILED DESCRIPTION OF THE PREFERRED EMBODIMENTS

Embodiments of the present invention will hereinafter be described in detail with reference to the drawings.

First Embodiment

First, a first embodiment of the present invention is described with reference to FIG. 1 to FIG. 7B.

Figure 1:
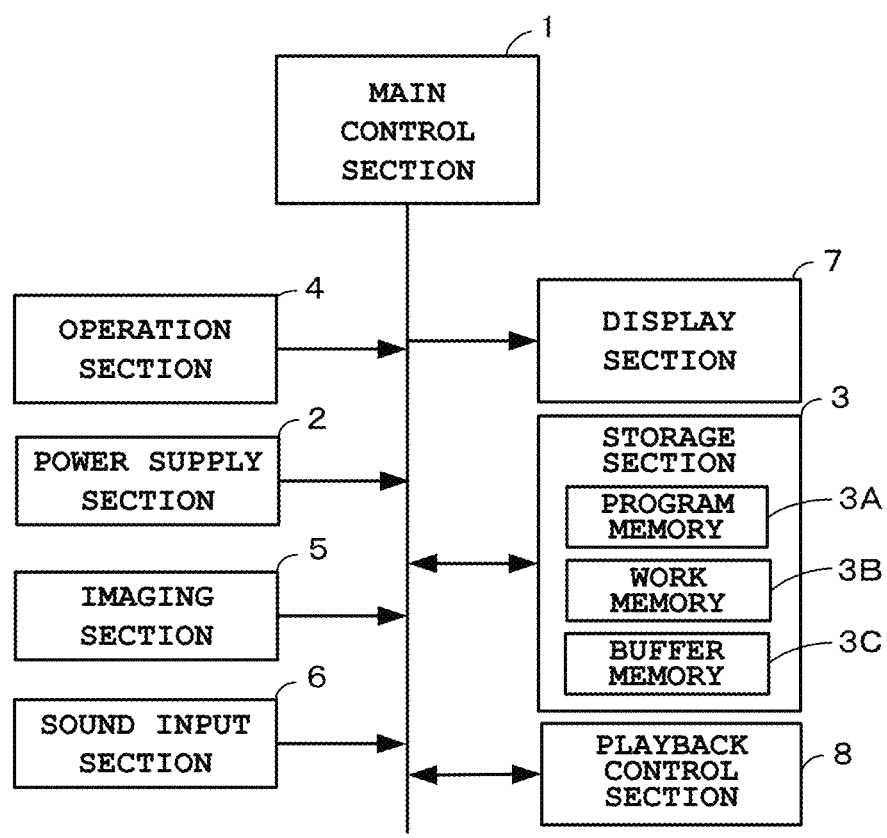
FIG. 1 is a block diagram showing basic components of a wearable camera, in which the present invention has been applied as an imaging apparatus.

FIG. 1 is a block diagram showing basic components of a digital camera, in which the present invention has been applied as an imaging apparatus.

This imaging apparatus (digital camera) is a wearable camera (for example, an arm-mount camera) capable of photographing with it being worn on a predetermined body part, and has an imaging function capable of capturing a moving image or still image of a photographic subject with high definition, a clock function for clocking a current time and timer time, and the like. Particularly, in the first embodiment, it has an interruption playback function. The interruption playback function is a function of reading out, at predetermined timing, images (captured images or recorded images) of a specific scene (user-desired interesting scene) specified in advance by a user operation from among moving images captured during moving image capturing and recording, and automatically performing interruption playback (playback during image capturing and recording or playback without stopping image capturing and recording). The interruption playback function will be described later in detail.

A main control section 1 in FIG. 1 operates by power supplied from a power supply section (secondary battery) 2, and controls the entire operation of the imaging apparatus (wearable camera) by following various programs stored in a storage section 3. The main control section 1 is provided with a processor (Central Processing Unit (CPU)), a memory, and the like not shown in the drawing. The storage section 3 is structured to have, for example, a ROM (Read Only Memory), a flash memory, and the like, and includes a program memory 3A where a program and various applications for achieving the present embodiment are stored, a work memory 3B for temporarily storing a flag and the like, a buffer memory (scene buffer) 3C having a predetermined capacity for sequentially storing images captured by the imaging function, and the like.

The buffer memory 3C is a temporary storage memory constituted, for example, by a ring buffer or the like, and records an image of a desired scene specified by a user (interesting scene) in an identifiable manner so that its recording position can be clearly indicated. When the amount of images recorded in the buffer memory 3C becomes equal to the capacity of the buffer memory 3C and the buffer memory 3C enters a full state, the main control section 1 overwrites and updates the oldest image with the latest image, and thereby records a predetermined amount of images. The storage section 3 may be structured to include a removable portable memory (recording medium) such as an SD (Secure Digital) card or an IC (Integrated Circuit) card, or may be structured to include, although not shown, a storage area on a predetermined server apparatus side in a case where the camera is connected to a network by a communication function.

Although not shown in the drawing, an operation section 4 includes various operation keys such as a power supply key for turning power on or off, an operation mode switching key, and an imaging condition setting key. In accordance with a key operation, the main control section 1 performs imaging processing, imaging condition setting processing, or the like. In particular, in the first embodiment, when a current mode is switched to the above-described imaging mode having the interruption playback function, captured images are acquired, displayed as a live view image, and sequentially recorded in the buffer memory 3C. During this image capturing and recording, images of a specific scene (interesting scene) specified in advance are read out from the buffer memory 3C at predetermined timing and subjected to interruption playback.

Although not shown in the drawing, an imaging section 5 in FIG. 1 is capable of capturing an image (moving image and still image) of a photographic subject with high definition by forming a subject image from an optical lens at an image sensor such as a CCD (Charge-Coupled Device) or CMOS (Complementary Metal Oxide Semiconductor), and has an imaging lens, the image sensor, various sensors, and an imaging control circuit (such as an analog processing section and a digital processing section). A sound input section 6 in FIG. 1 is structured to have a microphone where surrounding sound is inputted. Sound inputted from the sound input section 6 is recorded in a sound memory (omitted in the drawing) in association with an image captured by the imaging section 5. A display section 7 in FIG. 1 is constituted by a display and a display control circuit (for example, a liquid-crystal display device is used), and has a display screen that serves as a monitor screen (live view screen) for displaying images captured by the imaging section 5 (live view image) in real time or serves as a replay screen for replaying captured images (stored images).

When an interruption playback instruction is received from the main control section 1 during image capturing and recording in the imaging mode, a playback control section 8 performs processing of specifying an interesting scene of a playback target and reading out images of the interesting scene from the buffer memory 3C for interruption playback on the display screen of the display section 7. This playback control section 8 is provided with a processor (Central Processing Unit (CPU)), a memory, and the like not shown. In the first embodiment, the dedicated playback control section 8 is provided in addition to the main control section 1. However, the present invention is not limited thereto, and the main control section 1 may perform the operation of the playback control section 8 while performing the operation of image capturing and recording in parallel (time-division).

Figure 2A:
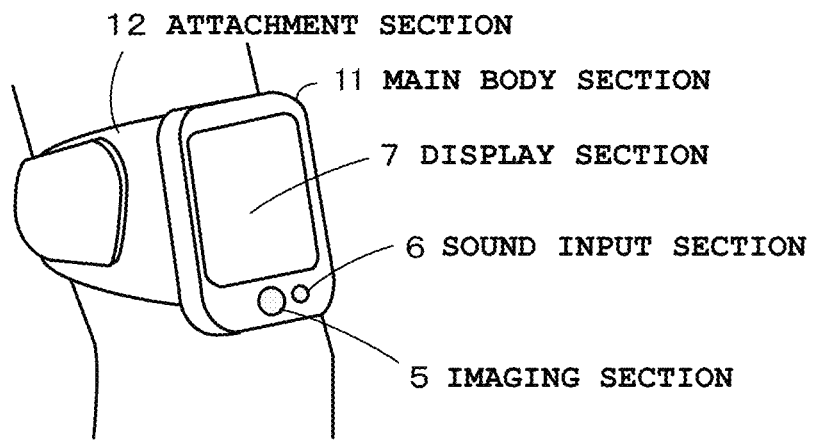
FIG. 2A is an external view of the wearable camera worn on an arm of a user.
Figure 2B:
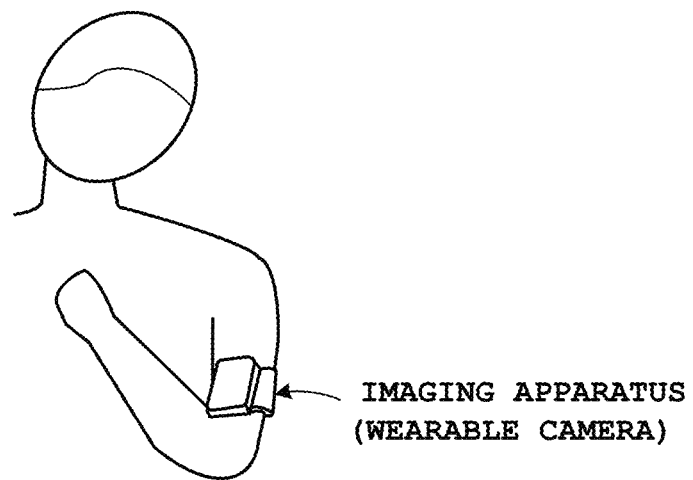
FIG. 2B is a diagram depicting a state where the user is viewing a screen of the wearable camera worn on the arm.

FIG. 2A and FIG. 2B are external views of the imaging apparatus (wearable camera) worn on an arm of the user.

In the structure of the imaging apparatus (wearable camera), a main body section 11 where the imaging section 5 and the display section 7 are arranged is provided on the front surface, and an attachment section 12 including a belt for wearing the imaging apparatus on an arm is also provided, as shown in FIG. 2A. By wearing the imaging apparatus on an arm, the user can capture an image of a forward direction viewed from the user with a wide angle in a handsfree manner.

FIG. 2B shows a state where the user is gazing into the display screen (monitor screen) of the display section 6 in the imaging mode by folding his or her arm inward to view the display section 6.

The main control section 1 analyses images captured during image capturing and recording and, if the face of the user set in advance is shown therein, detects the position of the user's eyeball or pupil to judge whether the sight line of the user is oriented to the display screen. In this case, since the imaging section 5 and the display section 6 are arranged on the same plane of the main body section 11, when the user orients his or her face diagonally downward so as to gaze into the display screen as shown in the drawing, the face of the user comes within the viewing angle of the imaging section 5. Therefore, by identifying the position of the eyeball or pupil, the direction of the sight line of the user can be detected.

Based on the analysis of captured images, when judged during image capturing and recording that the sight line of the user is oriented to the display screen, the main control section 1 provides the timing of this judgment to the playback control section 8 as playback instruction timing. When a timing signal giving a playback instruction is received from the main control section 1, the playback control section 8 specifies images (interesting scene) of the playback target based on the timing signal, and reads out the images of the interesting scene from the buffer memory 3C for interruption playback on the display screen of the display section 6. In the playback of the images of the interesting scene, slow playback is performed at a speed slower than (for example, one quarter of) the speed of the operation of sequentially recording the captured images. Note that, in some cases below, images of a specific scene (interesting scene) are referred to simply as a specific scene (interesting scene).

Next, the operation concept of the imaging apparatus (wearable camera) in the first embodiment is described with reference to flowcharts shown in FIG. 3 to FIG. 5B. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

Figure 3:
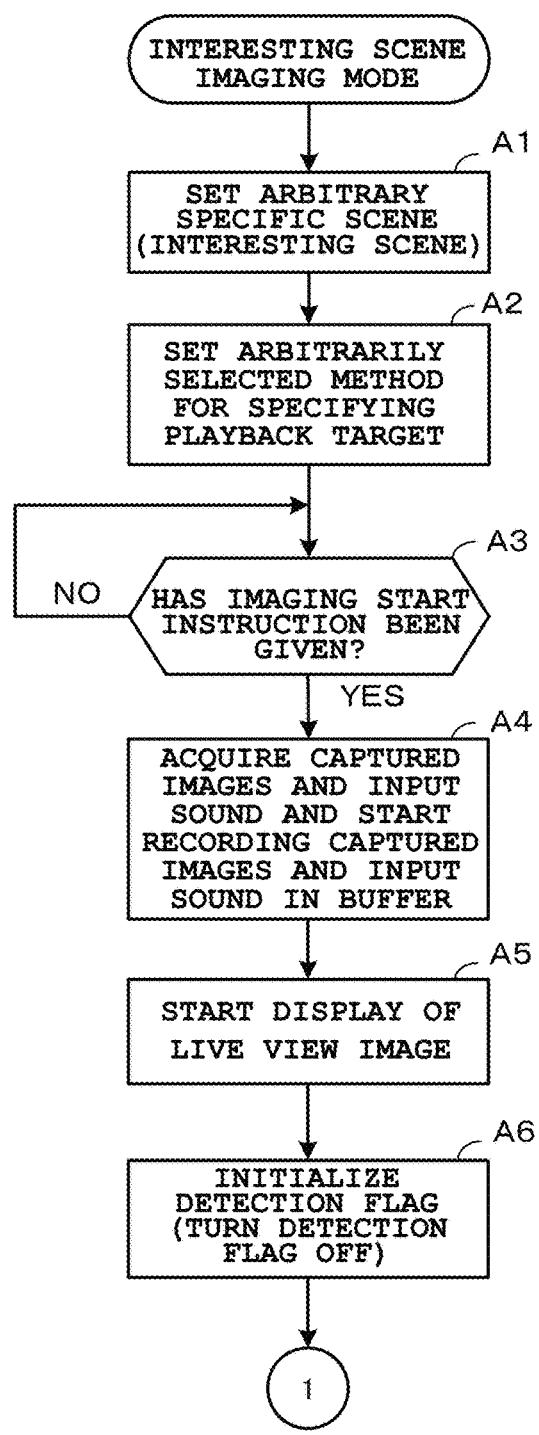
FIG. 3 is a flowchart of an operation of a main control section 1 (operation of a characteristic portion of a first embodiment) that is started when a current mode is switched to an imaging mode.
Figure 4:
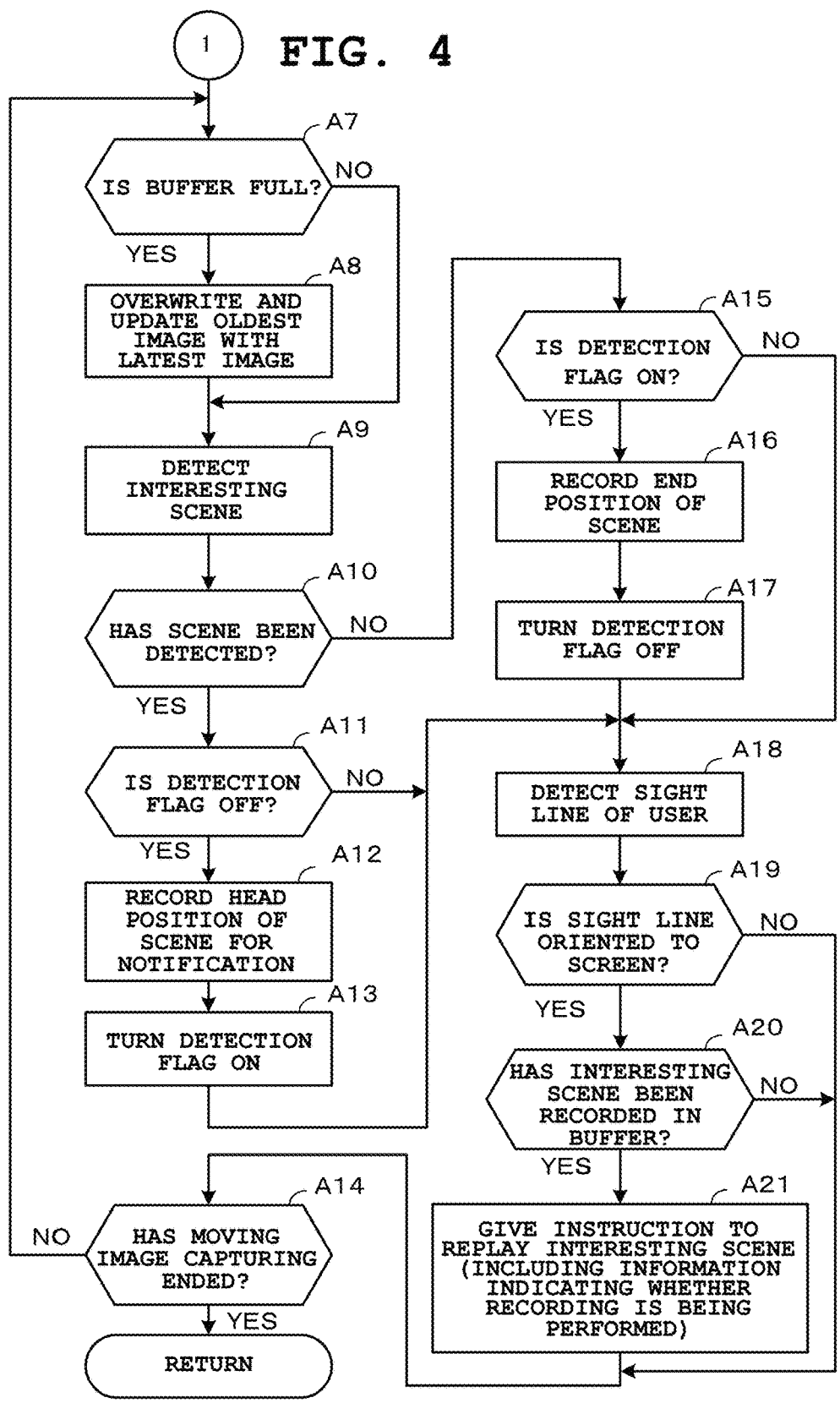
FIG. 4 is a flowchart of an operation subsequent to FIG. 3.

FIG. 3 and FIG. 4 are flowcharts outlining the operation of the characteristic portion of the present embodiment from among all of the operations of the main control section 1. After exiting these flows of FIG. 3 and FIG. 4, the main control section 1 returns to the main flow (omitted in the drawings) of the overall operation.

FIG. 3 and FIG. 4 are flowcharts of an operation of the main control section 1 (operation of the characteristic portion of the present embodiment) which is started when a current mode is switched to the imaging mode.

First, as processing (preparatory processing) to be performed prior to the start of an imaging and recording operation, the main control section 1 performs processing for setting a desired scene specified by the user (specific scene or interesting scene) (Step A1 in FIG. 3). Here, when information for specifying an interesting scene is inputted by a user operation, the main control section 1 sets the scene information in the work memory 3B.

For example, from among pieces of information including characteristic information regarding an image of a photographic subject (such as a person or pet) (if the photographic subject is a person, a face image and information regarding the characteristics of the face), information regarding a specific motion (such as a smile) of the photographic subject, and sound information of the photographic subject (such as a call), when at least one piece of information is inputted by a user operation as scene information, the main control section 1 performs processing of setting the scene information in the work memory 3B. Next, when a method for specifying an interesting scene that serves as an interruption playback target or specifying playback timing is selected by a user operation, the main control section 1 performs processing of setting the selected specifying method in the work memory 3B (Step A2). Note that this specifying method will be described later in detail.

After the setting processing described above, when an instruction to start image capturing is given by an operation on an imaging instruction key (YES at Step A3), the main control section 1 starts processing of acquiring images (moving image) captured by the imaging section 5 and sequentially recording the images in the buffer memory 3C (Step A4). Here, together with the start of the image capturing and recording, the main control section 1 also starts processing of acquiring sound information from the sound input section 6 and sequentially recording the sound information in the sound memory. In addition, the main control section 1 starts processing of displaying the captured images on the display screen (monitor screen) of the display section 7 as a live view image (Step A5). Then, after performing processing of initializing a flag (hereinafter referred to as a detection flag, which is omitted in the drawing) indicating that the interesting scene is being detected (setting off the flag) (Step A6), the main control section 1 returns to Step A7 of FIG. 4, and judges whether the buffer memory 3C is full (in a full state) during the image capturing and recording. When the buffer memory 3C is in a full state (YES at Step A7), the main control section 1 controls a writing operation in the buffer memory 3C to overwrite and update the oldest image with the latest image (Step A8).

Next, the main control section 1 acquires captured images, and analyzes the captured images and input sounds to judge whether the interesting scene is present (Step A9). For example, while sequentially analyzing the captured images, the main control section 1 detects a differential change of a background portion, detects the face of the photographic subject, detects the motion of a moving body, and detects input sounds. Then, by comparing the detection result and the interesting scene set at Step A1 described above, the main control section 1 detects the interesting scene based on a judgment as to whether both are similar in characteristic to each other, such as whether a set specific subject (such as a person) is shown in the images or whether the motion of the photographic subject is the specific motion.

As a result of the detection processing (Step A9), when the interesting scene is not detected (NO at Step A10), the main control section 1 judges whether the detection flag is ON (Step A15). Initially, the detection flag is OFF by the initialization (NO at Step A15), and therefore the main control section 1 proceeds to processing of detecting the sight line of the user (Step A18). In the sight line detection processing, the main control section 1 identifies the position of an eyeball or pupil from the face of the user shown in the viewing angle of the imaging section 5 and, based on the position of the eyeball or pupil, detects the direction of the sight line of the user. Based on the detection result, the main control section 1 judges whether the sight line of the user is oriented to the display screen (Step A19). Here, when the sight line is not oriented to the display screen (NO at Step A19), the main control section 1 proceeds to Step A14, and judges whether an instruction to end the moving image capturing has been provided by a user operation. When judged that an instruction to end the image capturing has not been provided (NO at Step A14), the main control section 1 returns to Step A7 to judge whether the buffer memory 3C is in a full state, and repeats the above-described operation until the interesting scene is detected at Step A10.

Here, as a result of the processing of detecting the interesting scene (Step A9), when the interesting scene is detected (YES at Step A10), the main control section 1 judges whether the detection flag is OFF (Step A11). Here, when judged that the interesting scene has been detected with the detection flag OFF (YES at Step A10 and YES at Step A11), since this is a case where the start of the interesting scene has been detected, such as a case where a specific person starts appearing in the viewing angle of the captured images or the subject starts performing a specific motion, the main control section 1 proceeds to Step A12, records position information for identifying the start position of the interesting scene in the buffer memory 3C, and notifies the user that the start of the interesting scene has been detected by flashing of the entire display screen. The notifying method is not limited to this, and the notification may be made by emitting alarm sound, light, vibration, or the like. Then, after performing processing of turning the detection flag ON (Step A13) for indicating that the interesting scene is being detected, the main control section 1 proceeds to processing of detecting the sight line of the user (Step A18).

As a result of the sight line detection processing (Step A18), when judged that the sight line is not oriented to the display screen (NO at Step A19), the main control section 1 returns to Step A7 on condition that an instruction to end the image capturing has not been given (NO at Step A14). Subsequently, as a result of the processing of detecting the interesting scene (Step A9), if the interesting scene is being detected (YES at Step A10), the detection flag stays ON (NO at Step A11), and therefore the main control section 1 proceeds to the sight line detection processing (Step A18). That is, since the detection flag has been configured to be turned on when the start of an interesting scene is detected, the fact that the flag is ON indicates that the interesting scene is being detected after the start of the interesting scene is detected. Accordingly, the main control section 1 proceeds to the sight line detection processing (Step A18), and continuously monitors for the sight line of the user even after the detection of the interesting scene.

On the other hand, as a result of the processing of detecting the interesting scene (Step A9), when the interesting scene is not detected (NO at Step A10), the main control section 1 judges whether the detection flag is ON as described above (Step A15). When the detection flag is ON (YES at Step A15), since this is a case where the state in which the interesting scene is being detected has been changed to the state in which the end of the interesting scene has been detected, the main control section 1 performs processing of recording position information for identifying the end position of the scene in the buffer memory 3C (Step A16). Then, after performing processing of turning the detection flag off (Step A17), the main control section 1 proceeds to the sight line detection processing (Step A18), and continuously monitors for the sight line of the user even after the end of the interesting scene.

Note that, after the detection of the start of the interesting scene, if the interesting scene ends without the sight line of the user being oriented to the display screen (YES at Step A15 and NO at Step A19), the main control section 1 returns from Step A14 to Step A7. Then, if the interesting scene is not detected thereafter (NO at Step A10), the main control section 1 proceeds to Step A15. In this case, since the detection flag has been turned OFF at the time of the detection of the end of the interesting scene (NO at Step A15), the main control section 1 proceeds to the sight line detection processing (Step A18), continuously monitors for the sight line of the user even after the end of the interesting scene.

Then, when the above-described operation is repeated until an instruction to end the image capturing is given at Step A14, captured images are sequentially recorded in the buffer memory 3C. Also, position information for identifying the start position and end position of the interesting scene every time the interesting scene is detected is recorded in the buffer memory 3C such that it is identifiable. In this embodiment, writing in the buffer memory 3C is performed by overwriting and updating the oldest image with the latest image. Therefore, a new moving image of a certain amount is recorded in the buffer memory 3C.

Here, as a result of the sight line detection processing (Step A18), when it is detected that the sight line of the user is oriented to the display screen (YES at Step A19), the main control section 1 provides a timing signal for instructing the playback control section 8 to perform playback (Step A21) on condition that the interesting scene has been recorded in the buffer memory 3C, that is, at least the position information indicating the start position of the interesting scene has been recorded (YES at Step A20). Here, in addition to the timing signal for a playback instruction, the main control section 1 provides the playback control section 8 with information indicating whether the interesting scene is being detected. Then, the main control section 1 proceeds to Step A14 described above, and returns to Step A7 on condition that an instruction to end the image capturing has not been given (NO at Step A14).

Figure 5:
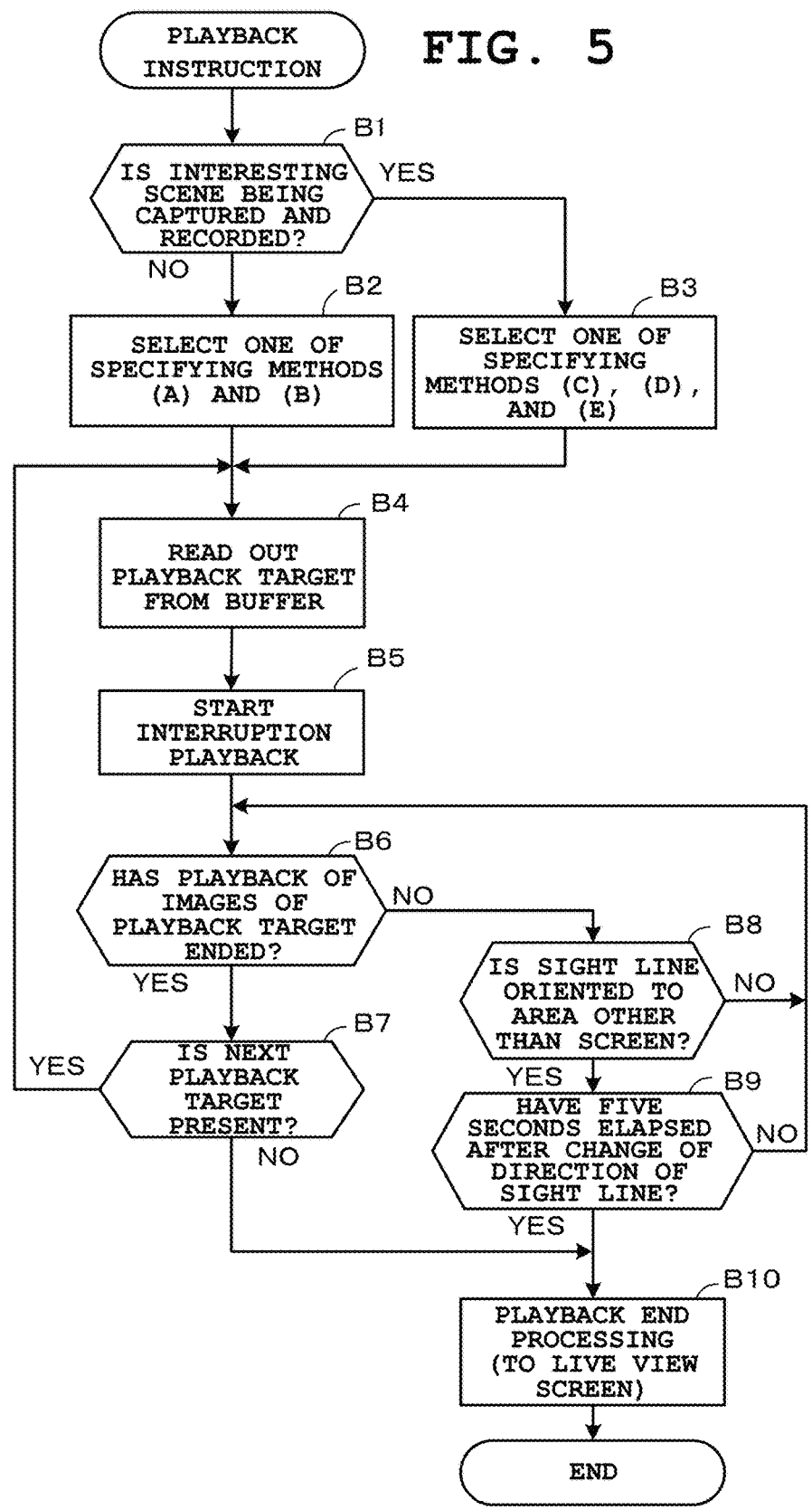
FIG. 5 is a flowchart of an operation of a playback control section 8 that is started in accordance with playback instruction timing from the main control section 1.

FIG. 5 is a flowchart of an operation of the playback control section 8 which is started in accordance with playback instruction timing provided from the main control section 1.

When the information indicating whether the image capturing and recording are being performed is received together with the timing signal for a playback instruction from the main control section 1, the playback control section 8 judges whether image capturing and recording are being performed (Step B1). If the timing when the sight line of the user is oriented to the display screen is not timing during image capturing and recording (NO at Step B1), the playback control section 8 selects the method set at Step A2 of FIG. 3 from specifying methods (A) and (B) described later (Step B2). When judged that image capturing and recording are being performed (YES at Step B1), the playback control section 8 selects the method set at Step A2 of FIG. 3 from specifying methods (C), (D), and (E) described later (Step B3). Then, by following the selected method, the playback control section 8 reads out images of the specified playback target from the buffer memory 3C (Step B4), and starts interruption playback (Step B5).

FIG. 6A and FIG. 6B are diagrams for describing various methods for performing interruption playback by specifying an image of a playback target.

FIG. 6A shows a case where playback instruction timing has been detected after the image capturing and recording of interesting scenes. In the example shown in the drawing, interesting scenes (1), (2), and (3) have been sequentially recorded in the buffer memory 3C. In the drawing, "t" represents time axis, and playback instruction timing has been received after the recording of the latest interesting scene (3).

When playback instruction timing is received after the image capturing and recording of interesting scenes as described above, one of methods (A) and (B) is selected. In method (A), an interesting scene recorded immediately before playback instruction timing is specified as a playback target, and replayed at the playback instruction timing. In method (B), an interesting scene recorded a predetermined time (for example, ten seconds) before playback instruction timing is specified as a playback target, and replayed at the playback instruction timing. In the example shown in the drawing, interesting scene (1) is specified as a playback target and replayed in method (A), and interesting scenes (2) and (3) are specified as playback targets and replayed in method (B).

FIG. 6B depicts a case where playback instruction timing has been detected during the image capturing and recording of an interesting scene. In the example shown in the drawing, interesting scenes (1), (2), and (3) have been sequentially recorded in the buffer memory 3C. In the example, "t" represents time axis, and playback instruction timing has been received after the recording of the latest interesting scene (3). When playback instruction timing is received during the image capturing and recording of interesting scenes, one of methods (C), (D), and (E) is selected. In method (C), an interesting scene during image capturing and recording is specified as a playback target, and the playback of this interesting scene is started after the completion of the recording. In method (D), the playback of the interesting scene is started immediately without waiting for the completion of the recording of the interesting scene during the image capturing and recording. In method (E), another specific scene recorded before the playback instruction timing is specified as a playback target and the playback of this specific scene is started immediately without waiting for the completion of the recording of the above-described interesting scene during the image capturing and recording.

In the example shown in the drawing, in method (C), interesting scene (3) during image capturing and recording is replayed after the completion of the recording. In method (D), interesting scene (3) is immediately replayed without waiting for the completion of the recording of interesting scene (3) during the image capturing and recording. In method (E), another interesting scene (2) different from interesting scene (3) that is being imaged and recorded is immediately replayed without waiting for the completion of the recording of interesting scene (3). After method (E) is selected, if images of an interesting scene recorded before playback instruction timing during image capturing and recording are present, the playback of these images is started. If such images have not been recorded, image playback is started after the completion of the image capturing and recording of images of an interesting scene that are being recorded. Therefore, even when method (E) is selected, if images of an interesting scene recorded before playback instruction timing are not present in practice, method (E) is switched to method (C).

Figure 7A:
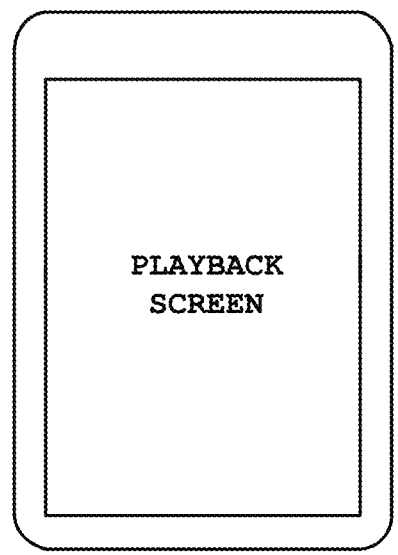
FIG. 7A and FIG. 7B are diagrams each depicting a display screen of a display section 7 where the interruption playback of an interesting scene is performed.
Figure 7B:
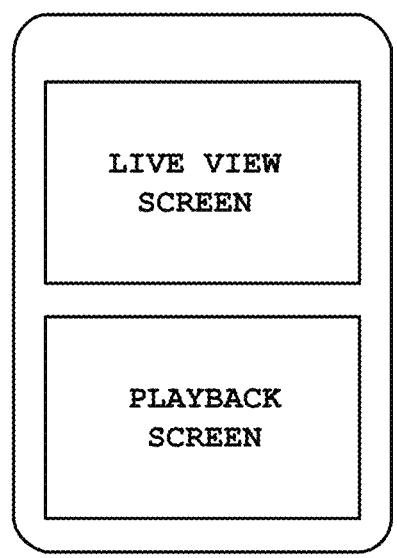

FIG. 7A and FIG. 7B are diagrams each depicting a playback screen of the display section 7 where the interruption playback of an interesting scene is performed.

FIG. 7A shows a case where the entire display screen of the display section 7 has been switched to an interruption playback screen. FIG. 7B shows a case where the display screen has been vertically divided into two screen, in which one half area (upper-half area) serves as a live view screen for displaying a live view image, and the other half area (lower-half region) serves as a screen for interruption playback. In interruption playback, captured images are subject to slow playback at a speed slower than that of the operation of sequentially recording captured images.

When the interruption playback of the interesting scene specified as a playback target as described above is started (Step B5), the playback control section 8 judges whether or not the playback of the images of the playback target has been performed to the end position (Step B6). When judged that the playback has not been ended (NO at Step B6), the playback control section 8 judges whether or not the sight line of the user is oriented to an area other than the display screen (Step B8). In this case as well, the playback control section 8 identifies the position of an eyeball or pupil of the user from the face of the user, and detects the direction of the sight line of the user based on the position of the eyeball or pupil. Here, when the face of the user is not shown in captured images, when the face of the user is shown in captured images but the eyeball or pupil cannot be identified, or when the eyeball or pupil can be identified but the direction of the sight line of the user is not oriented to the display screen, the playback control section 8 judges that the sight line of the user is no longer oriented to the display screen.

Here, when judged that the sight line of the user is not oriented to an area other than the display screen (NO at Step B8), since the user is continuously viewing the display screen, the playback control section 8 returns to Step B4 described above. When judged that the sight line is oriented to an area other than the display screen (YES at Step B8), the playback control section 8 judges whether or not a predetermined time (for example, five seconds) has elapsed after the change of the direction of the sight line (Step B9). That is, even when the sight line is oriented to an area other than the display screen, it may be only temporary in some cases. Therefore, the playback control section 8 judges whether or not the predetermined time has elapsed after the change of the direction of the sight line and, when judged that the predetermined time has not passed (NO at Step B9), the playback control section 8 returns to Step B4 described above, and stays in a standby state while repeating the above-described operation until the end of the playback is detected (NO at Step B6) or the predetermined time elapses after the sight line is oriented to an area other than the display screen (YES at Step B9).

Here, when the end of the playback is detected (YES at Step B6), the playback control section 8 judges whether or not the next playback target is present (Step B7). For example, when there is only one playback target with method (A) in FIG. 6A being selected, if the playback of this interesting scene ends, the playback control section 8 judges at Step B7 that "the next playback target is not present", and therefore proceeds to Step B10 to perform playback end processing so as to return the display screen of the display section 7 to a normal live view screen. When there are two playback targets with method (B) in FIG. 6A being selected, the playback control section 8 judges at Step B7 that "the next playback target is present" even when the first playback has been ended. Therefore, the playback control section 8 returns to Step B4, reads out images of the remaining playback target from the buffer memory 3C, and starts the playback of these images (Step B5). On the other hand, before the end of the playback, when the predetermined time elapses after the sight line of the user is oriented to an area other than the display screen (YES at Step B9), the playback control section 8 proceeds to Step B10, performs playback end processing, and returns the display screen of the display section 7 to the normal live view screen.

As described above, in the first embodiment, in image capturing and recording where images captured by the imaging section 5 are acquired and sequentially recorded, a desired specific scene (interesting scene) specified by the user is detected, timing for giving an instruction to perform the interruption playback of the images of this interesting scene is detected, and the images of the detected interesting scene are subjected to interruption playback in accordance with the detected playback instruction timing. As a result of this configuration, recorded images desired by the user can be subjected to interruption playback at appropriate timing without requiring a special operation during image capturing and recording.

Also, when an interesting scene is detected, this interesting scene is stored such that it is differentiated (by adding information regarding the start position and the end position). Then, the interesting scene is identified and read out for playback. As a result of this configuration, interesting scenes can be appropriately extracted and replayed.

Moreover, a period during which image capturing and recording is performed is an operation period where an operation of displaying captured images as a live view image is performed, and an interesting scene detected during this operation period is recorded. Accordingly, a live view image can be replayed.

Furthermore, when a plurality of interesting scenes have been recorded before playback instruction timing, an interesting scene taken at timing closest to the playback instruction timing is replayed from among the plurality of these interesting scenes. As a result of this configuration, a most recent image can be replayed based on playback instruction timing.

Still further, when captured images are being sequentially recorded in the buffer memory 3C, if the amount of recorded images becomes equal to the capacity, the oldest image is updated with a new image. As a result of this configuration, a certain amount of new images can be retained.

Yet still further, captured images are replayed at a speed slower than that for sequentially recording these images. As a result of this configuration, replayed images can be easily checked. In addition, even when playback is started during image capturing and recording, the replay position does not catch up with the image capturing and recording position.

Yet still further, when playback instruction timing is detected during image capturing and recording, playback is performed by using one of the methods including the method in which, after the recording of an interesting scene which is being captured and recorded is completed, the images of the interesting scene are specified as a playback target and the playback of these images is started; the method where the images of the interesting scene are immediately specified as a playback target and the playback of these images is started before the image capturing and recording is completed; and the method where another interesting scene recorded before the playback instruction timing is immediately specified as a playback target and the playback of the images thereof is started before the image capturing and recording is completed. As a result of this configuration, playback can be performed with various methods.

Yet still further, since the playback method can be selected from among the methods including the method in which, after the recording of an interesting scene which is being captured and recorded is completed, the images of the interesting scene are specified as a playback target and the playback of these images is started; the method where the images of the interesting scene are immediately specified as a playback target and the playback of these images is started before the image capturing and recording is completed; and the method where another interesting scene recorded before the playback instruction timing is immediately specified as a playback target and the playback of the images thereof is started before the image capturing and recording is completed, playback can be performed with a method desired by the user.

Yet still further, in a case where an interesting scene recorded before playback instruction timing has been recorded when the playback instruction timing is detected during image capturing and recording, the playback of the images of this interesting scene is started. If such an interesting scene has not been recorded, the playback of an interesting scene being captured and recorded is started after the image capturing and recording thereof is ended. As a result of this configuration, playback can be performed in accordance with the situation.

Yet still further, timing when the sight line of the user is oriented to the screen is detected as playback instruction timing. As a result of this configuration, the user's natural motion (motion of trying to view replayed image) can be detected and taken as playback instruction timing, and quick playback can be performed.

Yet still further, interruption playback ends when the sight line of the user is detected to have been oriented toward an area other than the screen. As a result of this configuration, interruption playback can be ended by the detection of the user's natural motion (motion of finishing replayed image viewing).

Yet still further, when an interesting scene is detected and recorded, a notification of the detection and recording is provided. As a result of this configuration, the user can orient his or her sight line to the screen in response to the notification.

Yet still further, as a condition for detecting an interesting scene, at least one piece of information among characteristic information regarding a photographic subject on the screen, motion information regarding the photographic subject, and sound information regarding the photographic subject is inputted and specified by a user operation. As a result of this configuration, a user-desired interesting scene can be appropriately specified.

In the descriptions of the above-described first embodiment, only the case has been described in which, when playback instruction timing is detected during image capturing and recording, the interruption playback of images is performed concurrently with the image capturing and recording operation. However, a configuration may be adopted in which, in addition to this interruption playback, the playback of recorded images are started when an image capturing and recording operation is completed. That is, when an interesting scene is not detected more than a predetermined time during image capturing and recording, a normal operation is started in which recorded images are sequentially replayed after the end of the image capturing and recording. As a result of this configuration, a playback operation can be started with unnecessary image capturing and recording being omitted.

Also, in the above-described first embodiment, timing when the sight line of the user is detected to have been oriented to the screen is detected as playback instruction timing. However, in place of the sight line, timing when the body (for example, the face or the upper body) is detected to have been oriented to the screen may be detected as playback instruction timing. Also, the end of playback may be detected when the body of the user is detected to have been oriented to an area other than the screen. Moreover, timing when the sight line and the body are detected to have been oriented to the screen may be detected as playback instruction timing. Note that the orientation of the body may be detected not only by image analysis but also by using an orientation sensor such as an acceleration sensor mounted in the imaging apparatus.

Moreover, in the above-described first embodiment, images captured by the imaging section 5 are acquired and sequentially recorded in the buffer memory 3C. When an interesting scene is detected, position information showing the start position and the end position of the scene are recorded. However, only the detected interesting scene may be recorded in the buffer memory 3C. That is, a configuration may be adopted in which specific scenes are sequentially recorded in the buffer memory 3C every time an interesting scene is detected.

Furthermore, in the above-described first embodiment, timing when the sight line of the user is detected to have been oriented to the screen is detected as playback instruction timing. However, predetermined timing immediately after the detection of an interesting scene or immediately after the recording of an interesting scene in the buffer memory 3C may be detected as playback instruction timing. That is, the recording of an interesting scene and the playback of the recorded images of this scene may be started immediately after the detection of the start of the interesting scene. In this case, even when image capturing and recording and image playback are started at substantially same timing, since the playback is performed slowly at a playback speed slower than the image capturing and recording speed, following playback can be performed. Also, image capturing and recording and image playback may not be performed at substantially same timing, and timing after a predetermined time (for example, three seconds) may be taken as playback instruction timing.

By this configuration where predetermined timing immediately after the detection of an interesting scene or immediately after the recording thereof is detected as playback instruction timing, the interruption playback of recorded images desired by the user can be performed at appropriate timing without requiring a special operation during image capturing and recording.

Still further, in the above-described first embodiment, specifying method (B) has been described in which an interesting scene recorded a predetermined time (for example, ten seconds) before playback instruction timing is specified as a playback target and replayed at the playback instruction timing. However, the present invention is not limited to the method where an interesting scene recorded a predetermined time before playback instruction timing is specified as a playback target, and a predetermined number of interesting scenes recorded earlier than playback instruction timing may be specified as playback targets, as shown in FIG. 8A. In the example shown in FIG. 8A which is a diagram basically similar to FIG. 6A, when playback instruction timing is detected after the image capturing and recording of interesting scene (3), a predetermined number of scenes (for example, two scenes), that is, interesting scenes (2) and (3) recorded earlier than the playback instruction timing are specified as playback targets.

In FIG. 8B, in a case where a predetermined number of scenes recorded earlier than playback instruction timing are specified as playback targets, if the number of recorded interesting scenes is small, even an old interesting scene is specified as a playback target. Therefore, among interesting scenes recorded in a predetermined amount of time (for example, twenty seconds), a predetermined number of (two) interesting scenes recorded earlier than playback instruction timing is specified as playback targets. In the example shown in the drawing, only interesting scene (3) has been recorded within the predetermined amount of time (for example, twenty seconds). Therefore, even though the predetermined number is two, only interesting scene (3) is specified as a playback target.

Yet still further, in the above-described first embodiment, an interesting scene is detected by analyzing captured images. However, the present invention is not limited to the configuration where an interesting scene is detected by analyzing images. For example, various sensors may be used to detect an environmental change or status change, and an interesting scene may be detected based on the environmental change or status change.

Yet still further, in the above-described first embodiment, images to be replayed by interruption playback at predetermined timing during image capturing and recording are recorded such that they are overwritten and updated by using temporary storage means with a storage capacity fixed in advance. However, if there is a space in the storage capacity, all captured images may be recorded without limiting the storage capacity in advance. In addition, a relatively small-capacity and high-speed temporary storage memory such as an internal memory may be used, or a removable low-speed large-capacity memory may be used.

Yet still further, in the above-described first embodiment, the sight line of the user is detected to give an instruction for playback. However, in addition to the detection of the sight line, a replay instruction may be given by a user operation.

Second Embodiment

Hereafter, a second embodiment of the present invention is described with reference to FIG. 9A to FIG. 10.

In the above-described first embodiment, the timing of giving an instruction to replay an interesting scene is detected during moving image capturing and recording, and interruption playback is performed at the playback instruction timing of detecting the interesting scene. In the second embodiment, at interruption playback during moving image capturing and recording, the playback speed is changed based on the situation of the user viewing the display screen. Note that sections that are basically the same or have the same name in both embodiments are given the same reference numerals, and therefore explanations thereof are omitted. Hereafter, the characteristic portions of the second embodiment will mainly be described.

Figures 9A, 9B:
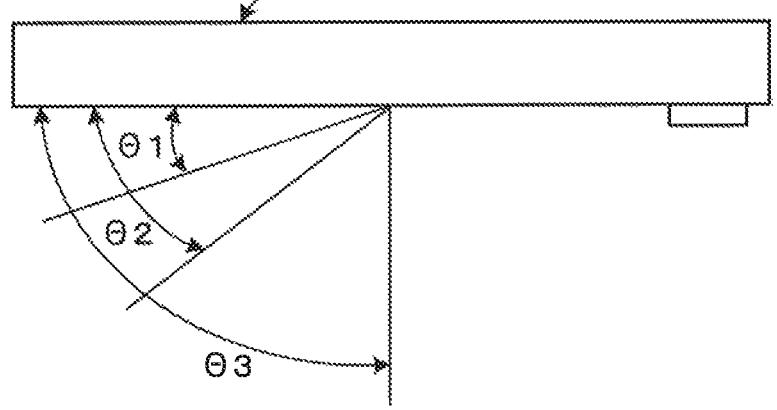
FIG. 9A is a diagram for describing a playback speed change table RS provided in a storage section 3 in a second embodiment.
FIG. 9B is a diagram showing angle ranges.

FIG. 9A is a diagram for explaining a playback speed change table RS included in the storage section 3 in the second embodiment.

The playback speed change table RS is a table that is referred to when a playback speed is changed based on the situation of the user viewing the display screen in interruption playback during moving image capturing and recording, and has fields of "sight line angle range", "gaze time", and "playback speed". "Sight line angle range" indicates an angle range when the face of the user is oriented to the display screen, in which an angle range of the sight line of the user within a range in a direction perpendicular to the display screen (horizontal plane) (within 90 degrees) is indicated. In the example in the drawing, angle ranges of "0≤θ<θ1", "θ1≤θ<θ2", and "θ2≤θ≤θ3" are shown. FIG. 9B shows angle ranges of "0≤θ<θ1", "θ1≤θ<θ2", and "θ2≤θ≤θ3". When "θ1" is 15 degrees, "θ2" is 45 degrees, and "θ3" is 90 degrees, three angle ranges are set, that is, a range not less than 0 degrees and less than 15 degrees, a range not less than 15 degrees and less than 45 degrees, and a range not less than 45 degrees and not more than 90 degrees.

In "gaze time", a duration in which the face of the user is oriented to the display screen is taken as a gaze time. In the example shown in the drawing, time ranges acquired by dividing time are "0≤T<T1", "T1≤T<T2", and "T2≤T". For example, when "T1" is two seconds and "T2" is three seconds, three time ranges are acquired by division, that is, a range not less than 0 seconds and less than two seconds, a range not less than two seconds and less than three seconds, and a range not less than three seconds. "Playback speed" indicates a speed of interruption playback. "V1" is stored in association with "sight line angle range" of "0≤θ<θ1" and "gaze time" of "0≤T<T1", "V2" is stored in association with "θ1≤θ<θ2" and "T1≤T<T2", and "V3" is stored in association with "θ2≤θ≤θ3" and "T2≤T". "V1", "V2", and "V3" have a relation of V1>V2>V3. The playback speed change table RS is set such that the playback speed is slower as "sight line angle range" is larger and "gaze time" is longer. The playback speed change table RS can be arbitrarily set by a user operation.

FIG. 10 is a flowchart outlining an operation (operation of a characteristic portion of the present embodiment) of the imaging apparatus (wearable camera) that is started when a current mode is switched to the imaging mode in the second embodiment.

First, the main control section 1 of the imaging apparatus (wearable camera) starts processing of acquiring images captured by the imaging section 5 and sequentially recording the images in the buffer memory 3C (Step C1), and also starts processing of displaying the captured images on the display screen of the display section 7 as a live view image (Step C2).

Next, the main control section 1 proceeds to processing of detecting the sight line of the user, identifying the position of an eyeball or pupil from the face of the user in the viewing angle of the imaging section 5, detecting the direction of the sight line of the user based on the position of the eyeball or pupil (Step C3), and judging whether or not the sight line of the user is oriented to the display screen (Step C4). Here, when the sight line is not oriented to the display screen (NO at Step C4), the main control section 1 proceeds to Step C13, and judges whether or not an instruction to end the moving image capturing has been given by a user operation. When judged that an instruction to end the image capturing has not been given (NO at Step C13), the main control section 1 returns to the sight line detection processing (Step C3), and repeats the above-described operations until the sight line is oriented to the display screen or an instruction to end the moving image capturing is given.

Here, when it is detected that the sight line is oriented to the display screen (YES at Step C4), the main control section 1 detects an angle in a perpendicular direction with respect to the display screen (horizontal plane) based on the direction of the sight line (Step C5), measures a duration in which the sight line is oriented to the display screen, and detects this duration as a gaze time in which the user is continuously viewing the display screen (Step C6). Then, the main control section 1 judges whether playback is being performed (Step C7). Initially, playback has not been started (NO at Step C7), and therefore the main control section 1 proceeds to Step C8, and determines a "playback speed" with reference to the playback speed change table RS based on the sight line angle and the gaze time detected this time (Step C8).

For example, the main control section 1 reads out a "playback speed" corresponding to the sight line angle and a "playback speed" corresponding to the gaze time, compares both playback speeds, and determines a slower speed as a playback speed. Note that an arbitrary method can be used to determine this playback speed and, for example, an average value between the playback speeds may be calculated. Next, the main control section 1 proceeds to Step C9, and starts an operation of replaying the recorded moving image in the buffer memory 3C at the determined "playback speed". In this case, the main control section 1 detects at Step C7 that playback is being performed as described above, and therefore proceeds to Step C10 to judge whether or not a section range is changed with reference to the playback speed change table RS based on the sight line angle and the gaze time detected this time.

For example, when the sight line angle detected at the start of the playback is smaller than θ1, and the current detection value is θ2, the section range is "0≤θ<θ1" to "θ≤θ1<θ2", and therefore the main control section 1 judges that the section range is changed. In this manner, when the section range of either one of the sight line angle and the gaze time is changed (YES at Step C10), the main control section 1 performs processing of reading out a "playback speed" corresponding to the changed section range and changing the playback speed (Step C11). Then, the main control section 1 continues the interruption playback with the changed "playback speed" (Step C12). Then, if an instruction to end the moving image capturing is not given (NO at Step C13), the main control section 1 returns to the sight line detection processing (Step C3), and repeats the above-described operation.

As described above, in the second embodiment, in image capturing and recording where images captured by the imaging section 5 are acquired and sequentially recorded, a playback speed is changed based on the situation of the user viewing the display screen, and interruption playback is performed at this changed playback speed. As a result of this configuration, the interruption playback of recorded images can be performed appropriately without requiring a special operation during image capturing and recording. Accordingly, for example, when whether or not an image is interesting to the user is judged based on the situation of the user viewing the display screen, if the image is not interesting the user, a playback speed therefor is changed to a relatively high speed and playback is performed at normal speed. If the image is interesting to the user, the playback speed can be changed to a slow speed for slow playback.

Also, when the sight line of the user is oriented to the display screen, the degree of the orientation of the sight line is detected, and a playback speed is changed based on the degree of the sight line. As a result of this configuration, whether an image being replayed is interesting to the user can be judged based on the degree of the orientation of the sight line.

Moreover, as a degree of orientation of the sight line of the user, the angle of the sight line with respect to the display screen and a duration (gaze time) in which the sight line is continuously oriented to the display screen are detected. As a result of this configuration, whether an image being replayed is interesting to the user can be more appropriately judged.

Furthermore, interruption playback is performed at a speed slower than that of the operation of sequentially recording captured images. As a result of this configuration, even when recorded images are replayed during image capturing and recording, this playback does not catch up with the image capturing and recording.

In the above-described second embodiment, as a situation of the user viewing the display screen, the degree of the orientation of the sight line is detected, that is, the angle of the sight line with respect to the display screen and a duration (gaze time) in which the sight line is continuously oriented to the display screen are detected. However, the situation of the user is not limited to thereto. For example, the degree of the orientation of the body (for example, the face or upper body) of the user oriented to the display screen may be detected. In this case, the angle of the body with respect to the display screen and a duration in which the body is continuously oriented to the display screen may be detected. The orientation of the body may be detected not only by image analysis but by using an orientation sensor such as an acceleration sensor.

Also, in each of the above-described embodiments, the buffer memory 3C for temporary storage is used. However, a memory that records and stores captured images may be used in place of the buffer memory 3C.

Also, in each of the above-described embodiments, the present invention has been applied in a wearable camera as an imaging apparatus. However, the present invention is not limited thereto, and may be applied to a portable compact camera or to a camera-equipped personal computer, a PDA (Personal Digital Assistance), a tablet terminal apparatus, a portable telephone such as a smartphone, an electronic game machine, a music player, and the like.

Moreover, the "apparatuses" or the "sections" described in the above-described embodiments are not required to be in a single housing and may be separated into a plurality of housings by function. In addition, the steps in the above-described flowcharts are not required to be processed in time-series, and may be processed in parallel, or individually and independently.

Furthermore, all or part of various functions constituted by electronic circuits in each of the above-described embodiments may be achieved by software (causing a program stored in a RAM or ROM to be executed by the CPU). Also, all or part of various functions achieved by software in each of the above-described embodiments may be constituted by an electronic circuit(s).

Still further, the plural functions (processing or sections) required to achieve the various effects described above can be freely divided. The following are examples thereof.

(Configuration 1)
An imaging apparatus including:
an imaging section which includes an image sensor;
a display section which includes a display;
a storage section which includes a memory; and
a control section which includes a processor,
in which the control section performs control of (i) setting a specific scene in advance, (ii) sequentially storing images continuously captured by the imaging section in the storage section as a storing operation, (iii) specifying images corresponding to the specific scene from among a plurality of images stored in the storage section when a predetermined motion of a user is detected during the storing operation, and (iv) displaying the specified images on the display section while continuing the storing operation.

(Configuration 2)
The imaging apparatus described in configuration 1, in which the control section newly specifies images corresponding to the specific scene from among the plurality of images stored in the stored section and displays the specified images on the display section while continuing the storing operation, every time the predetermined motion of the user is detected.

(Configuration 3)
The imaging apparatus described in configuration 1, in which the control section causes images corresponding to the specific scene and captured at timing corresponding to timing of detection of the predetermined motion of the user among the plurality of images stored in the storage section to be displayed on the display section at the timing corresponding to the timing of the detection of the predetermined motion of the user, when the predetermined motion of the user is detected during the storing operation.

(Configuration 4)
The imaging apparatus described in configuration 3, in which the control section causes images corresponding to the specific scene and captured at timing closest to the timing of the detection of the predetermined motion of the user among the plurality of images stored in the storage section to be displayed on the display section immediately after the predetermined motion of the user is detected, when the predetermined motion of the user is detected during the storing operation.

(Configuration 5)
The imaging apparatus described in configuration 1, in which the control section sets in advance an arbitrary scene specified by the user as the specific scene.

(Configuration 6)
The imaging apparatus described in configuration 1, in which the control section (i) sequentially detects the specific scene during the storing operation, (ii) stores images corresponding to the detected specific scene in the storage section such that the images are differentiated from other images, and (iii) displays, on the display section, the images corresponding to the specific scene stored in the storage section in a manner to be differentiated, when the predetermined motion of the user is detected.

(Configuration 7)

The imaging apparatus described in configuration 1, in which the control section (i) sequentially detects the specific scene during the storing operation, (ii) sequentially stores only images corresponding to the detected specific scene in the storage section, and (iii) causes images captured at timing corresponding to timing of detection of the predetermined motion of the user among the plurality of images stored in the storage section to be displayed on the display section at the timing corresponding to the timing of the detection of the predetermined motion of the user, when the predetermined motion of the user is detected.

(Configuration 8)

The imaging apparatus described in configuration 7, in which the control section sequentially stores the images corresponding to the specific scene in the storage section while causing the images continuously captured by the imaging section to be displayed on the display section as a live view image.

(Configuration 9)

The imaging apparatus described in configuration 1, in which the control section, when sequentially storing the images continuously captured by the imaging section in a temporary storage area having a predetermined storage capacity in the storage section, (i) updates an oldest image with a new image for storage if images of an amount equal to the storage capacity have been stored, (ii) specifies images corresponding to the specific scene from among images stored in the temporary storage area, and (iii) displays the specified images on the display section.

(Configuration 10)

The imaging apparatus described in configuration 1, in which the control section (i) sequentially stores the images continuously captured by the imaging section in the storage section as moving images, (ii) specifies a moving image of a segment corresponding to the specific scene from among the moving images stored in the storage section when the predetermined motion of the user is detected during storage of the moving images, (iii) replays the specified moving image of the segment while continuing the storage of the moving images. (iv) and displays the specified moving image on the display section.

(Configuration 11)

The imaging apparatus described in configuration 10, in which the control section sequentially detects the specific scene during the storage of the moving images, and specifies a segment from start of the specific scene in the moving images to end of the specific scene as the segment corresponding to the specific scene.

(Configuration 12)

The imaging apparatus described in configuration 10, in which the control section, when the moving image of the segment corresponding to the specific scene is being stored at timing of detection of the predetermined motion of the user, performs playback by using any one of (i) a method to start playback of the moving image of the segment after completing storage of the moving image of the segment, (ii) a method to immediately start the playback of the moving image of the segment without waiting for completion of the storage of the moving image of the segment, and (iii) a method to immediately start playback of a moving image of another segment corresponding to the specific scene stored before the timing of the detection of the predetermined motion of the user without waiting for the completion of the storage of the moving image of the segment.

(Configuration 13)

The imaging apparatus described in configuration 12, in which the control section allows the user to select, as a playback and display method when the moving image of the segment corresponding to the specific scene is being stored at the timing of the detection of the predetermined motion of the user, any one of (1) a method to start the playback of the moving image of the segment after completing the storage of the moving image of the segment, (ii) a method to immediately start the playback of the moving image of the segment without waiting for the completion of the storage of the moving image of the segment, and (iii) a method to immediately start the playback of the moving image of another segment corresponding to the specific scene stored before the timing of the detection of the predetermined motion of the user without waiting for the completion of the storage of the moving image of the segment.

(Configuration 14)

The imaging apparatus described in configuration 12, in which the control section, when there is a moving image of a segment corresponding to the specific scene completely stored before the timing of the detection of the predetermined motion of the user during the storage of the moving images, starts playback of the moving image of the segment, and in which the control section, when there is no moving image of a segment corresponding to the specific scene completely stored before the detection timing, waits for the completion of the storage of the moving image of the segment corresponding to the specific scene which is being stored, and then starts the playback of the moving image of the segment.

(Configuration 15)

The imaging apparatus described in configuration 1, in which the control section detects, as the predetermined motion of the user, a motion of operating a predetermined operation key or a motion of the user orienting a body or sight line to a display screen.

(Configuration 16)

The imaging apparatus described in configuration 1, in which the control section starts image display at timing of detection of the predetermined motion of the user, and ends the image display at end timing of the detection.

(Configuration 17)

The imaging apparatus described in configuration 1, in which the control section, when the specific scene is detected or stored in the storage section during the storing operation, gives a notification regarding detection or storage.

(Configuration 18)

The imaging apparatus described in configuration 1, in which the control section detects the specific scene based on at least one of characteristic information regarding a photographic subject in an image, motion information regarding the photographic subject, and sound information regarding the photographic subject.

(Configuration 19)

The imaging apparatus described in configuration 10, in which the control section detects a situation of the user viewing a display screen during playback of the moving image, and changes a playback speed of the moving image based on the detected situation of the user.

(Configuration 20)

The imaging apparatus described in configuration 19, in which the control section, when a body or sight line of the user is oriented to the display screen during the playback of the moving image, detects at least one of (i) an angle of the body or sight line with respect to the display screen and (ii) a time in which the body or sight line is continuously oriented to the display screen, and changes the playback speed in accordance with the detected angle or time.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
an imaging section which includes an image sensor;
a display section which includes a display;
a storage section which includes a memory; and
a control section which includes a processor,
wherein the control section performs control of (i) setting a specific scene in advance, (ii) sequentially storing images continuously captured by the imaging section in the storage section as a storing operation, (iii) specifying images corresponding to the specific scene from among a plurality of images stored in the storage section when a predetermined motion of a user is detected during the storing operation, and (iv) displaying the specified images corresponding to the specific scene on the display section while continuing the storing operation,
wherein the control section, when there is an image of a segment corresponding to the specific scene completely stored before a timing of detection of the predetermined motion of the user during the storing operation, starts playback of the image of the segment, and
wherein the control section, when there is no image of a segment corresponding to the specific scene completely stored before the timing of the detection of the predetermined motion of the user during the storing operation, waits for completion of storage of an image of a segment corresponding to the specific scene which is being stored, and then starts playback of the image of the segment.

2. The imaging apparatus according to claim 1, wherein the control section newly specifies images corresponding to the specific scene from among the plurality of images stored in the storage section and displays the specified images on the display section while continuing the storing operation, every time the predetermined motion of the user is detected.

3. The imaging apparatus according to claim 1, wherein the control section causes images corresponding to the specific scene and captured at a timing corresponding to the timing of the detection of the predetermined motion of the user among the plurality of images stored in the storage section to be displayed on the display section at the timing corresponding to the timing of the detection of the predetermined motion of the user, when the predetermined motion of the user is detected during the storing operation.

4. The imaging apparatus according to claim 3, wherein the control section causes images corresponding to the specific scene and captured at a timing closest to the timing of the detection of the predetermined motion of the user among the plurality of images stored in the storage section to be displayed on the display section immediately after the predetermined motion of the user is detected, when the predetermined motion of the user is detected during the storing operation.

5. The imaging apparatus according to claim 1, wherein the control section sets in advance an arbitrary scene specified by the user as the specific scene.

6. The imaging apparatus according to claim 1, wherein the control section (i) sequentially detects the specific scene during the storing operation, (ii) stores images corresponding to the detected specific scene in the storage section such that the images are differentiated from other images, and (iii) displays, on the display section, the images corresponding to the specific scene stored in the storage section in a manner to be differentiated, when the predetermined motion of the user is detected.

7. The imaging apparatus according to claim 1, wherein the control section (i) sequentially detects the specific scene during the storing operation, (ii) sequentially stores only images corresponding to the detected specific scene in the storage section, and (iii) causes images captured at timing corresponding to the timing of the detection of the predetermined motion of the user among the plurality of images stored in the storage section to be displayed on the display section at the timing corresponding to the timing of the detection of the predetermined motion of the user, when the predetermined motion of the user is detected.

8. The imaging apparatus according to claim 7, wherein the control section sequentially stores the images corresponding to the specific scene in the storage section while causing the images continuously captured by the imaging section to be displayed on the display section as a live view image.

9. The imaging apparatus according to claim 1, wherein the control section, when sequentially storing the images continuously captured by the imaging section in a temporary storage area having a predetermined storage capacity in the storage section, (i) updates an oldest image with a new image for storage if images of an amount equal to the storage capacity have been stored, (ii) specifies images corresponding to the specific scene from among images stored in the temporary storage area, and (iii) displays the specified images on the display section.

10. The imaging apparatus according to claim 1, wherein the control section (i) sequentially stores the images continuously captured by the imaging section in the storage section as moving images, (ii) when the predetermined motion of the user is detected during storage of a moving image, specifies a moving image of a segment corresponding to the specific scene from among the moving images stored in the storage section, (iii) replays the specified moving image of the segment while continuing the storage of the moving image, (iv) and displays the specified moving image on the display section.

11. The imaging apparatus according to claim 10, wherein the control section sequentially detects the specific scene during the storage of the moving image, and specifies a segment from a start of the specific scene in the moving image which is being stored to an end of the specific scene as the segment corresponding to the specific scene.

12. The imaging apparatus according to claim 10, wherein the control section, when a moving image of a segment corresponding to the specific scene is being stored at a timing of detection of the predetermined motion of the user, performs playback by using any one of:
(i) a method to, after completing storage of said moving image of said segment which is being stored, start playback of said moving image of said segment, (ii) a method to immediately start the playback of said moving image of said segment without waiting for completion of the storage of said moving image of said segment, and (iii) a method to immediately start playback of a moving image of another segment corresponding to the specific scene stored before the timing of the detection of the predetermined motion of the user without waiting for the completion of the storage of said moving image of said segment.

13. The imaging apparatus according to claim 12, wherein the control section allows the user to select, as a playback and display method when said moving image of said segment corresponding to the specific scene is being stored at the timing of the detection of the predetermined motion of the user, any one of:

(i) a method to start the playback of said moving image of said segment after completing the storage of said moving image of said segment, (ii) a method to immediately start the playback of said moving image of said segment without waiting for the completion of the storage of said moving image of said segment, and (iii) a method to immediately start the playback of the moving image of the another segment corresponding to the specific scene stored before the timing of the detection of the predetermined motion of the user without waiting for the completion of the storage of said moving image of said segment.

14. The imaging apparatus according to claim 1, wherein the control section detects, as the predetermined motion of the user, a motion of operating a predetermined operation key or a motion of the user orienting a body or a sight line to a display screen.

15. The imaging apparatus according to claim 1, wherein the control section starts image display at the timing of the detection of the predetermined motion of the user, and ends the image display at an end timing of the detection.

16. The imaging apparatus according to claim 1, wherein the control section, when the specific scene is detected or stored in the storage section during the storing operation, gives a notification regarding detection or storage to the user.

17. The imaging apparatus according to claim 1, wherein the control section detects the specific scene based on at least one of characteristic information regarding a photographic subject in an image, motion information regarding the photographic subject, and sound information regarding the photographic subject.

18. The imaging apparatus according to claim 10, wherein the control section detects a situation of the user viewing a display screen during playback of the specified moving image, and changes a playback speed of the specified moving image based on the detected situation of the user.

19. The imaging apparatus according to claim 18, wherein the control section, when a body or a sight line of the user is oriented to the display screen during the playback of the specified moving image, detects at least one of (i) an angle of the body or the sight line with respect to the display screen and (ii) a time in which the body or the sight line is continuously oriented to the display screen, and changes the playback speed of the specified moving image in accordance with the detected angle or the detected time.

20. An image playback method for an imaging apparatus, comprising:
setting a specific scene in advance;
sequentially storing continuously captured images as a storing operation;
specifying images corresponding to the specific scene from among a plurality of stored images when a predetermined motion of a user is detected during the storing operation;
displaying the specified images corresponding to the specific scene while continuing the storing operation;
when there is an image of a segment corresponding to the specific scene completely stored before a timing of detection of the predetermined motion of the user during the storing operation, starting playback of the image of the segment; and
when there is no image of a segment corresponding to the specific scene completely stored before the timing of the detection of the predetermined motion of the user during the storing operation, waiting for completion of storage of an image of a segment corresponding to the specific scene which is being stored, and then starting playback of the image of the segment.

21. A non-transitory computer-readable storage medium having a program stored thereon that is executable by a computer in an imaging apparatus to perform functions comprising:
setting a specific scene in advance;
sequentially storing continuously captured images as a storing operation;
specifying images corresponding to the specific scene from among a plurality of stored images when a predetermined motion of a user is detected during the storing operation;
displaying the specified images corresponding to the specific scene while continuing the storing operation;
when there is an image of a segment corresponding to the specific scene completely stored before a timing of detection of the predetermined motion of the user during the storing operation, starting playback of the image of the segment; and
when there is no image of a segment corresponding to the specific scene completely stored before the timing of the detection of the predetermined motion of the user during the storing operation, waiting for completion of storage of an image of a segment corresponding to the specific scene which is being stored, and then starting playback of the image of the segment.

22. An image playback method for an imaging apparatus, comprising:
setting a specific scene in advance;
sequentially storing continuously captured images as a storing operation;
specifying images corresponding to the specific scene from among a plurality of stored images when a predetermined motion of a user is detected during the storing operation;
displaying the specified images corresponding to the specific scene while continuing the storing operation; and
when a body or a sight line of the user is oriented to a display screen during playback of the specified images, detects at least one of (i) an angle of the body or the sight line with respect to the display screen and (ii) a time in which the body or the sight line is continuously oriented to the display screen, and changes a playback speed of the specified images in accordance with the detected angle or the detected time.

* * * * *